United States Patent [19]

Takanashi et al.

[11] Patent Number: 4,641,723
[45] Date of Patent: Feb. 10, 1987

[54] HANDLE SWITCH ASSEMBLY FOR A MOTOR VEHICLE

[75] Inventors: Masami Takanashi, Yokohama; Akihiro Komatsu, Tokyo, both of Japan

[73] Assignee: Honda Giken Kogyo Kabushiki Kaisha, Tokyo, Japan

[21] Appl. No.: 506,357

[22] Filed: Jun. 21, 1983

[30] Foreign Application Priority Data

Jun. 23, 1982 [JP] Japan ............................. 57-93892[U]
Jun. 23, 1982 [JP] Japan ............................. 57-93894[U]
Jun. 23, 1982 [JP] Japan ............................. 57-93895[U]

[51] Int. Cl.⁴ .......................................... B60K 26/00
[52] U.S. Cl. ................................. 180/315; 180/219; 180/332; 280/289 H
[58] Field of Search ................. 180/90, 315, 332, 333, 180/334, 219, 229; 280/289 H; 296/70; 200/52 R, 61.85, 340; 74/551.1, 552; 307/10 R; 116/279, DIG. 17, DIG. 28

[56] References Cited

U.S. PATENT DOCUMENTS

| | | | |
|---|---|---|---|
| 1,160,259 | 11/1915 | Cassidy | 180/332 |
| 4,037,683 | 7/1977 | LeBell | 180/219 |
| 4,180,713 | 12/1979 | Gonzales | 180/333 |

FOREIGN PATENT DOCUMENTS

| | | | |
|---|---|---|---|
| 2619075 | 9/1977 | Fed. Rep. of Germany | 280/289.H |
| 2844797 | 4/1979 | Fed. Rep. of Germany | 180/219 |
| 1190198 | 10/1959 | France | 74/551.1 |
| 2517272 | 6/1983 | France | 180/90 |

Primary Examiner—John J. Love
Assistant Examiner—Kenneth R. Rice
Attorney, Agent, or Firm—Birch, Stewart, Kolasch & Birch

[57] ABSTRACT

A handle switch assembly for a motor vehicle having a bar-like handle member with handle grips, comprises a switch housing mounted on the handle member adjacent to the handle grip, at least two push button switch elements housed in the switch housing, and push buttons connected to each of the push button switch elements, the push buttons being movable in a direction perpendicular to a longitudinal axis of the handle member, wherein the push buttons are disposed in a manner that a distances between an end of the push buttons on the side of the handle grip and the handle grip differ from one another so that the push buttons are distinguished from one another merely by touching head portions thereof.

3 Claims, 23 Drawing Figures

FIG. 1
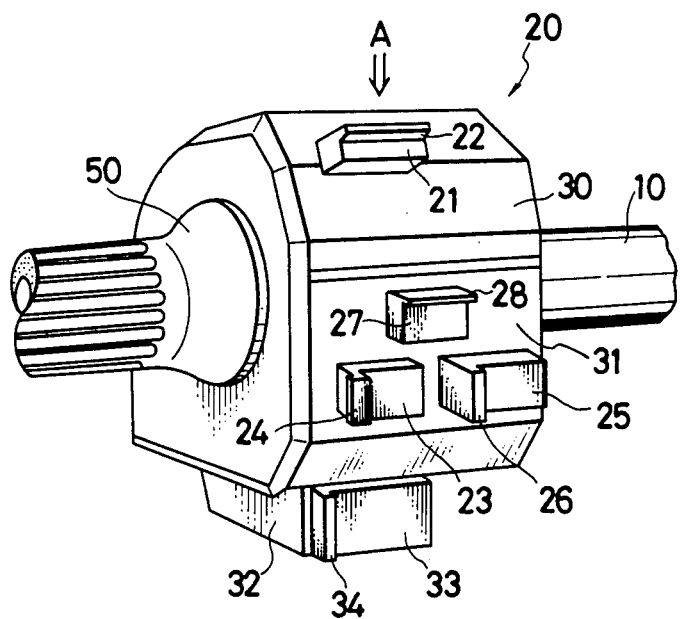
FIG. 2
FIG. 3
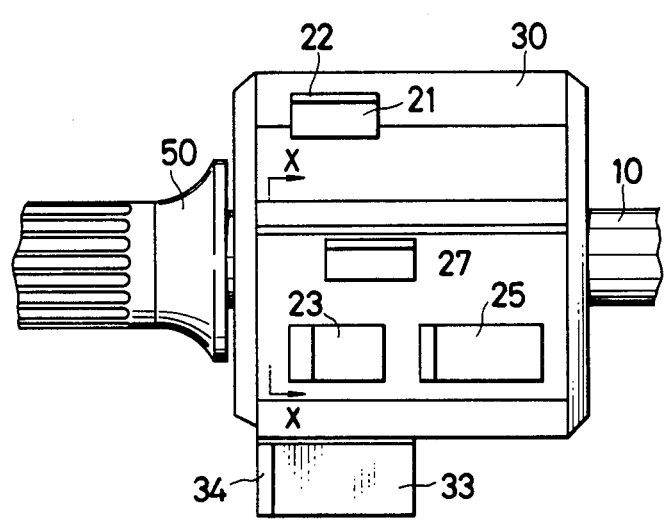

FIG.9A  FIG.9B
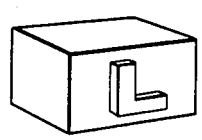
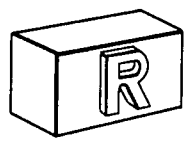
FIG.10
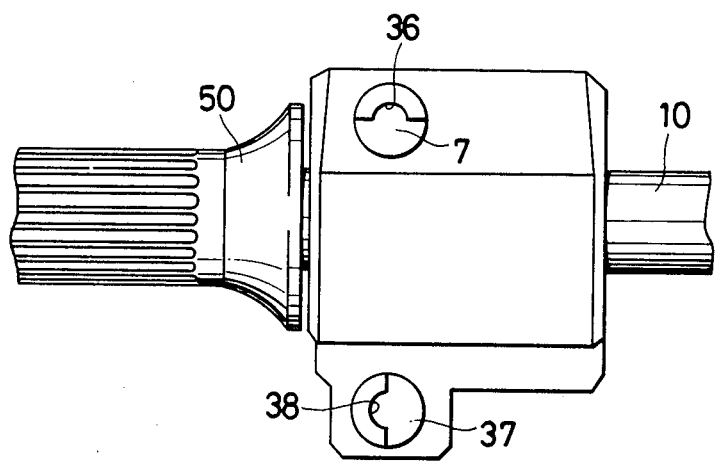

HANDLE SWITCH ASSEMBLY FOR A MOTOR VEHICLE

BACKGROUND OF THE INVENTION

1. Field of the Invention

The present invention relates to a handle switch assembly for a motor vehicle, and more specifically to a handle switch assembly for a motor vehicle having a bar-like handle member, such as a motorcycle.

2. Description of Background Information

In the case of a motorcycle, it is general to provide various switches in a switch housing mounted on a handle bar, at a position adjacent to a handle grip which is mounted on an extremity of the handle bar. For instance, turn signal switches, a horn switch, a lighting switch, and a dimmer switch are housed in the switch housing, and these switches are so arranged as to be operated from a control face which is disposed at a rear end (with respect to the forward movement of the motorcycle) of the switch housing.

Since a plurality of switches having various functions are disposed in a single housing and the switches are generally operated by an individual who is driving the motorcycle (referred to as a driver) without seeing the push buttons and the control faces of the switch housing, it is desirable to provide means for identifying the switch elements so that the correct one of the switch elements can be operated by the driver without seeing the push buttons or the control face of the switch housing.

SUMMARY OF THE INVENTION

An object of the present invention is therefore to provide a handle switch assembly for a motor vehicle, which is provided with means for promoting identification between the switch buttons of the switch elements.

According to the present invention, a handle switch assembly for a motor vehicle having a bar-like handle member with handle grips, comprises a switch housing mounted on the handle member adjacent to the handle grip, at least two push button switch elements housed in the switch housing, and push buttons connected to each of the push button switch elements, the push buttons being movable in a direction perpendicular to a longitudinal axis of the handle member, wherein the push buttons are disposed in a manner so that the distances between an end of the push buttons on the side of the handle grip and the handle grip differ from one another.

According to another aspect of the invention, sizes of the push buttons are different from one another.

According to a further aspect of the invention, the size of a push button which is disposed further from the handle grip than another push button is determined to be larger than the size of the another push button.

According to still another aspect of the invention the push buttons are respectively provided with protrusions on head portions thereof.

According to a still further aspect of the invention, the protrusions are elongated with longitudinal axes in different directions from one another.

According to another aspect of the invention, one of the push buttons which is located in an upper part of the switch housing is provided with an elongated protrusion on an upper peripheral portion of the head portion, and another one of the push buttons which is located in a lower part of the switch housing is provided with an elongated protrusion on a side of peripheral portion of the head portion thereof close to the handle grip.

According to a further aspect of the invention, sizes of the protrusions are different from one another.

According to a still further aspect of the invention, areas of the protrusions are different from one another.

According to another aspect of the invention, heights of the protrusions are different from one another.

According to a further aspect of the invention, one of the protrusions has a portion projecting along a surface of the switch housing in which the push buttons are disposed.

According to a still further aspect of the invention, the protrusion is further provided with a main portion from which the portion is projected, and the main portion is substantially perpendicular to the surface of the switch housing.

According to another aspect of the invention, the protrusions are in the form of alphabetical letters.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein:

FIG. 1 is a perspective view of an embodiment of the handle switch assembly according to the present invention;

FIG. 2 is a front elevation of the handle switch assembly shown in FIG. 1;

FIG. 3 is a partial side elevation of the handle switch assembly shown in FIG. 2, taken along a line X—X;

FIGS. 9A and 9B are perspective views of the switch operating members on which a projection having the form of an alphabetical letter is formed;

FIG. 10 is a front elevation of a handle switch assembly according to the present invention, on which a switch operating member having a cylindrical body is provided;

DETAILED DESCRIPTION OF THE PREFERRED EMBODIMENTS

Figure 4:
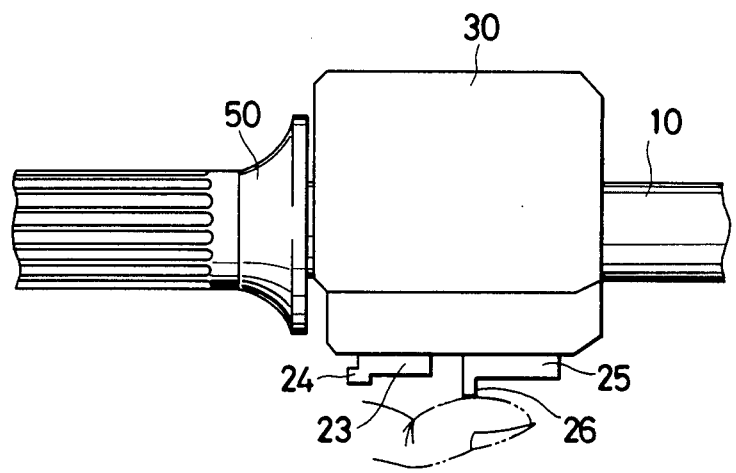
FIG. 4 is a plan view of the handle switch assembly shown in FIG. 1, viewed from the direction shown by the arrow A in FIG. 1.

Reference is first made to FIG. 1, which shows a first embodiment of the switch assembly according to the present invention. As shown, the handle switch assembly generally designated by 20 includes a switch housing 30 which is mounted on a handle pipe 10, close to a handle grip 50 also mounted on the handle pipe 10. The switch housing 30 houses therein a plurality of switch elements for turn signal switches, a horn switch, a dimmer switch, for example. Each of the switch elements is provided with a push button or a switch knob as a member for operating the switch element, and these push buttons are disposed in a control face 31 of the switch housing which is provided in the rear (with respect to the forward movement of the motorcycle) side of the switch housing 30. In the case of the arrangement shown in FIG. 1, a push button 21 of a dimmer switch is placed on the top of the control face 31. Also, push buttons 23 and 25 for left and right turn signal switches are disposed at the bottom of the control face 31. A push button 27 of a turn signal reset switch is disposed just above the push buttons 23 and 25. Further, a horn switch 32 is disposed under the switch housing 30 and a push button 33 of the horn switch 32 is disposed just beneath the push buttons 23 and 25 of the turn signal switch. These push buttons have generally rectangular form and are to be pressed by the driver by using his/her thumb while holding the handle grip. Therefore, as shown in FIG. 2, the push buttons are arranged substantially in a vertical direction with respect to the axis of the handle pipe. Furthermore, according to the present invention, the push buttons 21, 23, 25, 27 and 33 are provided with respective protrusions of the head portion thereof so that the switch elements are distinguished from each other. The protrusions are arranged in such a manner that the heights and the directions thereof are different form each other. Specifically, the push buttons 21 and 27 are respectively provided with elongated protrusions 22 and 28 at an upper portion of a periphery of the head portion thereof. Similarly, the push buttons 23, 25 and 33 are respectively provided with protrusions 24, 26, and 34 along a left (closer to the handle grip 50) side edge of the head portion thereof. The arrangement of these protrusions is determined with due regards to the facility of the manipulation of the switches by using the thumb of the driver. Furthermore, the push button 25 of the right turn signal switch is designed to have a width larger than that of the push button 23 of the left turn signal switch and the protrusion 24 of the push button 23 is formed wider than the protrusion 26 of the push button 25, while the height of the protrusion 26 is greater than that of the push button 23, which is clearly shown in the side elevation of FIG. 3. The manner of operating the push buttons 23 and 25 is exemplary indicated in the plan view of FIG. 4, in which the shapes of the protrusions 24 and 26 are also clearly illustrated.

Figure 5:
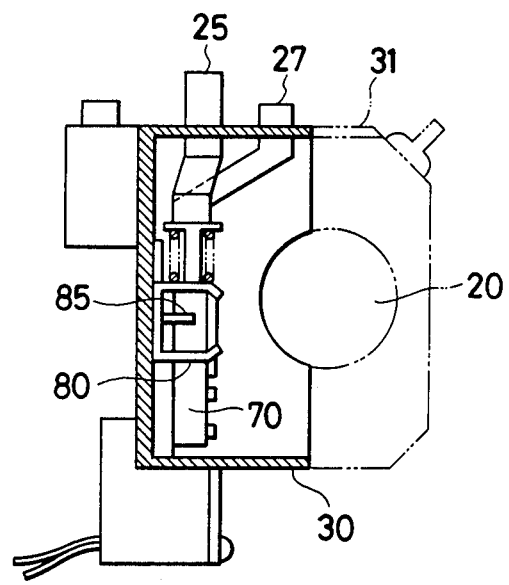
FIG. 5 is a cross-sectional side view of a handle switch assembly similar to a handle switch assembly shown in FIG. 1.
Figure 6:
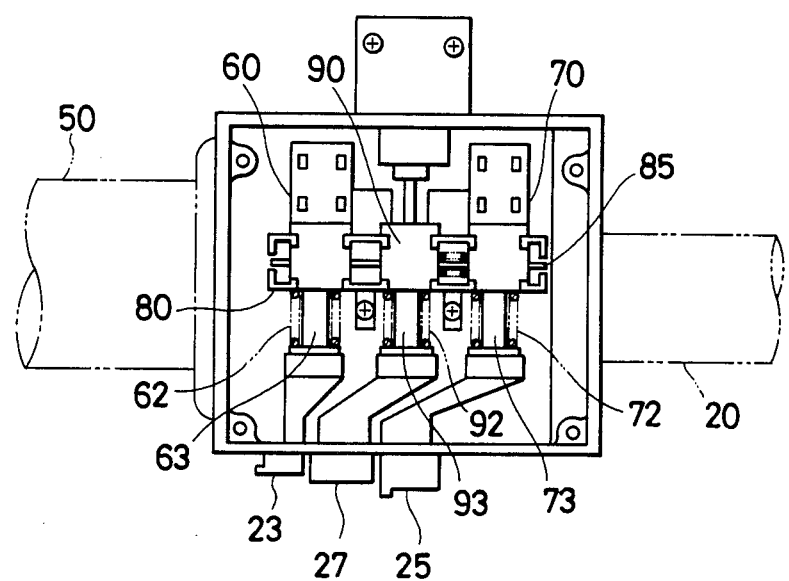
FIG. 6 is a cross-sectional plan view of the handle switch assembly shown in FIG. 5.
Figure 7:
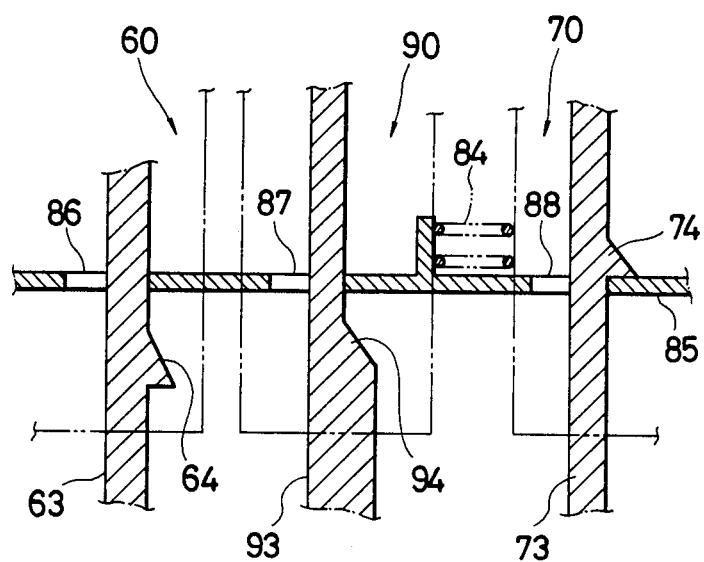
FIG. 7 is an enlarged cross-sectional view showing the latching movement of the push rods and the locking plate.

Referring to FIGS. 5 to 7, a structural arrangement of a handle assembly similar to the handle switch assembly which has been explained with reference to FIG. 1 through 4, will be explained hereinafter.

As shown in FIG. 5 and FIG. 6, The handle switch assembly has a switch housing 30 mounted on the handle pipe 10 at adjacent to a handle grip 50. In the switch housing 30, switch elements 60 and 70 for left and right turn signals are arranged in parallel with each other and fixed on a generally U shaped switch holder member 80. The switch element 60 which is used for the left turn signal is connected to a push button 23 disposed at a left-hand side of a lower portion of a control face 31 of the switch housing 30 via a push rod 63 which extends from an end portion of the push button 23. Similarly, the switch element 70 which is used for the right turn signal is connected to a push button 25 disposed at right-hand side of the lower portion of the control face 31 of the switch housing 30 via a push rod 73 which extends from an end portion of the push button 25. Also, a stopper portion 90 is disposed between the switch elements 60 and 70 and supported by the switch holder member 80. A push rod 93 of a push button 27 for resetting the turn signal is received in the stopper portion 90 and the push button 27 is disposed at a central portion of the control face 31 of the switch housing. The switch holder member 80 is fixed to an inner wall of the switch housing 30 by means of a plurality of screws (not shown). Further, each of push rods 63, 73 and 93 are provided with a return spring 62, 72 and 92 for applying a biasing force against the push buttons 23, 25 and 27. In a space formed in the U shaped portion of the switch holder member, there is disposed a latching plate 85 which is engagable with each of the push rods 63, 73 and 93. The operation of the latching plate 85 will be explained with reference to FIG. 7 hereinafter. As shown in FIG. 7, the latching plate 85 are disposed in the switch holder member 80 in a direction perpendicular to the axes of the movement of the push rods 63, 73 and 93. Also, the latching plate 85 is provided with three recesses 86, 87 and 88 through which the push rods 63 and 73 and 93 pass respectively. Further, the latching plate 85 is provided with a projection which receives a biasing force of a return spring 84 for directing the latching plate 85 from right to left in FIG. 7. The push load 63 and 73 are respectively provided with a protrusion 64 and 74 which has a slope portion cooperative with an edge portion of each of recesses 86 an 88 of the latching plate 85. Similarly, the push load 90 is provided with a slope portion 94 which can cooperate with an edge portion of the recess 87 of the latching plate 85.

With this arrangement, when the push button 23 is pressed by the driver, the push rod 63 is moved to the side of the switch element against the resilient force of the return spring 62. During this movement, the latching plate 85 is displaced by a contact between the edge portion of the recess 86 and the slope portion of the protrusion 64 of the push rod 63 until the protrusion 64 is completely moved to the back side of the latching plate 85. After this movement of the protrusion 64, the latching plate 85 is automatically replaced by means of the resilient force of the return spring 84 so that the push are 63 and the push button 23 are latched in the pressed position. In this state, a movable contact mounted on the push rod 63 is moved between a pair of stationary contacts provided in the switch element 60 and an electric current flows through the movable contact and the stationary contacts to actuate the left turn signal. Similarly, when the push button 25 is pressed by the driver, the push rod 73 and the push button 25 are latched in the pressed position by the latching plate 85 (shown in FIG. 7) and consequently the right turn signal is produced by the operation of the switch element 70 which is provided with a pair of stationary contacts and a movable contact mounted on the push rod 73 (not shown). On the other hand, when the push button 27 is pressed by the driver, the slope portion 94 of the push rod 93 will contact with the edge portion of the recess 87 of the latching plate 85. By further movement of the push rod 93 and the slope portion 94, the latching plate 85 is displaced rightward and releases the protrusion 64 or 74 if the protrusion has been latched by the latching plate 85 as shown in FIG. 7. In this way, the left and right turn signals are produced by the operation of the push buttons 23 an 25 and reset by the operation of the push button 27.

Figure 8A:
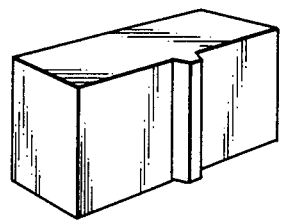
FIGS. 8A through 8G are perspective views showing the variation of the projection which is to be provided on the switch operating members of the handle switch assembly according to the present invention.
Figure 8B:
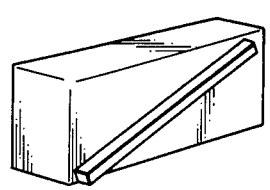
Figure 8C:
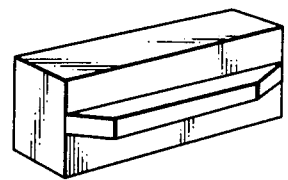
Figure 8D:
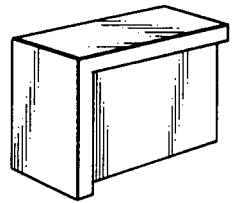
Figure 8E:
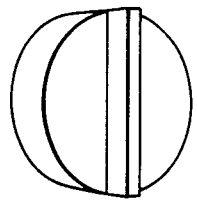
Figure 8F:
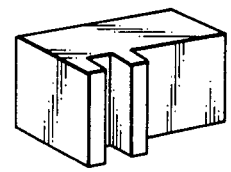
Figure 8G:
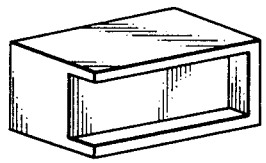

Referring to FIGS. 8A through 8G, modifications of the protrusion to be formed on the head portion of the push button will be explained. The protrusion shown in FIG. 8A is vertically disposed at the center of the head portion of a rectangular push button. The protrusion shown in FIG. 8B is disposed along a diagonal line of the head portion of a rectangular push button. The protrusion shown in FIG. 8C is horizontally disposed at the center of the head portion of a rectangular push button. Further, the protrusion shown in FIG. 8D has a generally L-shaped configuration formed along an upper edge an a left edge of the head portion of a rectangular push button. In the case of the protrusion shown in FIG. 8E, the push button on which the protrusion is formed has a cylindrical shape and the protrusion is disposed vertically at the center of the head portion thereof. The protrusion shown in FIG. 8F consists of a couple of vertical protrusions disposed at the left side of the head portion of a rectangular push button. Finally, the protrusion shown in FIG. 8G has a generally U-shaped configuration and is formed on the periphery of the head portion of a rectangular push button.

As another example, the protrusion can take the form of alphabetical letters such as L and R which are shown in FIGS. 9A and 9B. In that case, there is an advantage that the function of the switch will be easily distinguished from the shape of the protrusion. FIG. 10 shows a further example of protrusions. As shown, protrusions 36 and 38 are formed on cylindrical push buttons 35 and 37 and have a generally C-shaped configuration.

Figure 11:
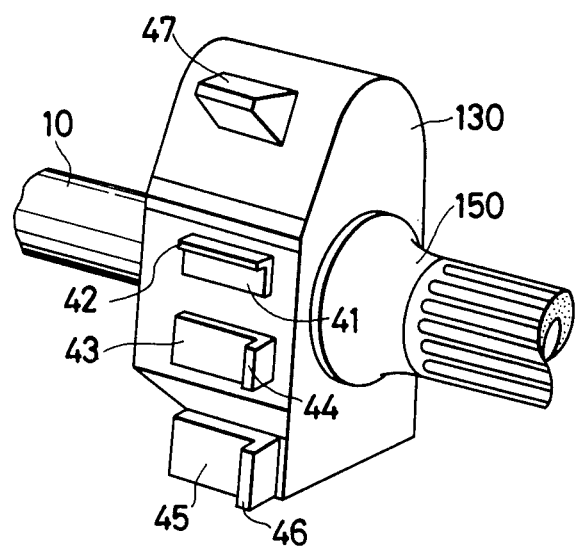
FIG. 11 is a perspective view of a second embodiment of the handle switch assembly according to the present invention.
Figure 12:
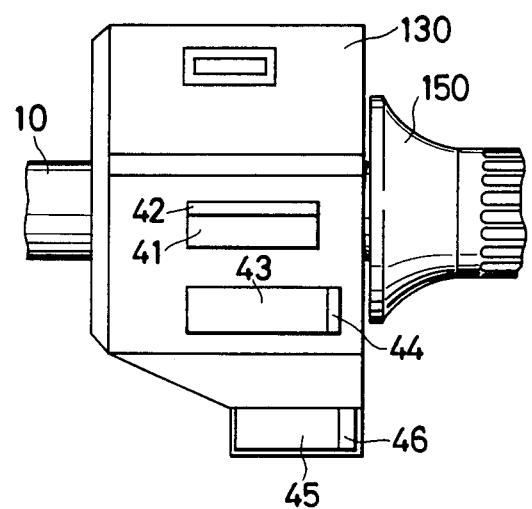
FIG. 12 is a front elevation of the handle switch assembly shown in FIG. 11.
Figure 13:
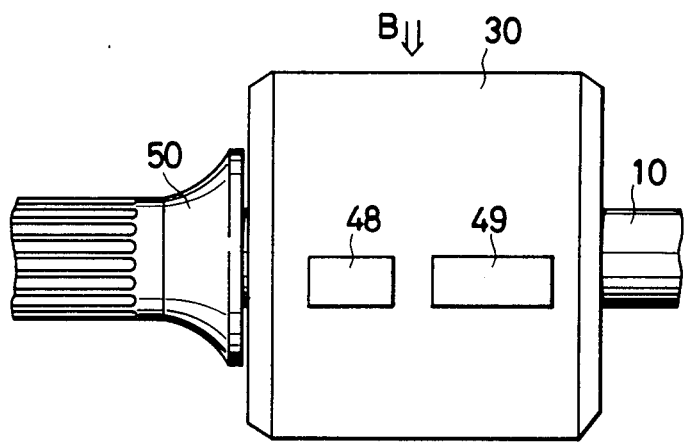
FIG. 13 is a front view of a third embodiment of the switch assembly according to the present invention.
Figure 14:
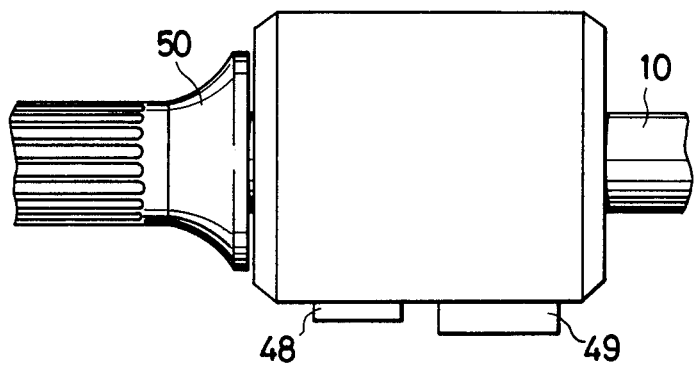
FIG. 14 is a plan view of the handle switch assembly shown in FIG. 13, viewed from a direction shown by the arrow B in FIG. 13.
Figure 15A:
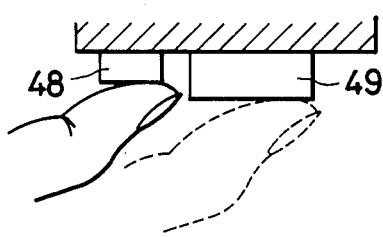
FIGS. 15A and 15B are plan views of the handle switch assembly shown in FIG. 10, especially showing the manner of operating the switch elements.
Figure 15B:
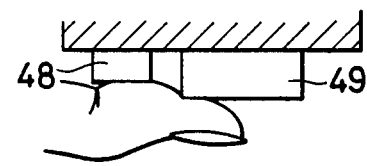

Referring to FIGS. 11 and 12, a second embodiment of the handle switch assembly according to the present invention will be explained hereinafter. In the case of this embodiment, a switch housing 130 is mounted on the handle pipe 10 close to a handle grip 150 which is also mounted on the right side end of the handle pipe 10. In a control face 131 of the switch housing, there are disposed a plurality of switch buttons such as a switch button 41 for a position (auxiliary lamps) switch and a switch button 43 for a head lamp switch. An elongated protrusion 42 is formed on the switch button 41 of the position switch in the direction parallel to an axis of the handle pipe 10 and the handle grip 150 and which protrusion 42 is disposed on an upper periphery of the switch button 41. Similarly, a protrusion 44 having the direction normal to the axis of the handle pipe 10 is formed on the right-hand side of the switch button 43 of the head lamp switch. Furthermore, there are provided a switch button 47 and a switch button 45 with a protrusion 46 in the control face 131 of the switch housing 130. As clearly shown in the front elevation of FIG. 12, the identification of these switch buttons is facilitated also by an arrangement such that a distance (d) between the right-side end of the switch button and a flange portion 151 of the handlegrip 150 differs from each other. Specifically, the distance (d) is the minimum for the switch button 45 and it gradually increases to the maximum for the switch button 47.

Reference is made to FIGS. 13 through 15A and 15B, which show the third embodiment of the handle switch assembly according to the present invention. As shown, a pair of push buttons 48 and 49 are disposed in the switch housing 30 mounted on the handle pipe 10 at a position close to the handle grip 50. The push buttons 48 and 49 are arranged in parallel to a longitudinal axis of the handle pipe 10 and have different heights in the direction of reciprocating movement thereof. Furthermore, the length of the push button 48 is designed to be shorter than that of the push button 49. These features are clearly shown in the plan view of FIG. 14. As it is apparent from an example of the operation of these push buttons 48 and 49 shown in FIGS. 15A and 15B, the push buttons 48 and 49 are easily distinguished from each other by means of the difference between the levels of the head portions thereof and by the difference between the size of the push button 48 and the size of the push button 49.

It will be appreciated from the foregoing that according to the present invention, it is very easy to distinguish a switch button or a push button from the other only by touching the head portion of the switch buttons. Therefore, the operation of the switch element in a switch housing mounted on a handle pipe is greatly facilitated as compared with the conventional arrangement.

It should be understood that the foregoing description is for illustrative purpose only, and is not intended to limit the scope of the invention. Rather, there are numerous equivalents to the preferred embodiments, and such are intended to be covered by the appended claims.

What is claimed is:

1. A handle switch assembly for a motor vehicle having a bar-like member with handle grips, comprising:
    a switch housing mounted on said handle member adjacent to said handle grip;
    at least two push button switch elements housed in said switch housing;
    push buttons connected to each of said push button switch elements, wherein said push buttons are disposed in a manner that distances between an end of each of said push buttons on the side of said handle grip and said handle grip differ from one another, and said push buttons are respectively provided with a protrusion on a head portion thereof, said protrusion being formed on an end of said head portion, said end of head portion being located away from a central portion of a body of said push button switch element; and
    one of said push buttons which is located in an upper part of said switch housing is provided with said elongated protrusion in an upper peripheral portion of said head portion, and another one of said push buttons which is located in a lower part of said switch housing is provided with said elongated protrusions on a side of peripheral portion of said head portion thereof close to said handle grip.

2. A handle switch assembly for a motor vehicle having a bar-like handle member with handle grips, comprising;
- a switch housing mounted on said handle member adjacent to said handle grip;
- at least two push button switch elements housed in said switch housing;
- push buttons connected to each of said push button switch elements, wherein said push buttons are disposed in a manner that distances between an end of each of said push buttons and the side of said handle grip and said handle grip differ from one another, and said push buttons are respectively provided with a protrusion on a head portion thereof, said protrusion being formed on an end of said head portion, said end of head portion being located away from a central portion of a body of said push button switch elements; and
- said protrusion is further provided with a main portion form which said portion is projecting, and said main portion is substantially perpendicular to said surface of switch housing.

3. A handle switch assembly for a motor vehicle having a bar-like handle member with handle grips, comprising;
- a switch housing mounted on said handle member adjacent to said handle grip;
- at least two push button switch elements housed in said switch housing;
- push buttons connected to each of said push button switch elements, wherein said push buttons are disposed in a manner that distances between an end of each of said push buttons on the side of said handle grip and said handle grip differ from one another, and said push buttons are respectively provided with a protrusion on a head portion thereof, said protrusion being formed on an end of said head portion, said end of head portion being located away from a central portion of a body of said push button switch element; and
- said two push button switch elements are respectively disposed in an upper part and a lower part of said switch housing and said protrusion is provided, on said head portion, near a side face of said push button.

* * * * *